United States Patent
Beloesch

(10) Patent No.: US 7,603,334 B2
(45) Date of Patent: Oct. 13, 2009

(54) CODE COVERAGE OF DECLARATIVE OBJECTS

(75) Inventor: Anthony C. Beloesch, Vashon, WA (US)

(73) Assignee: Microsoft Corporation, Redmond, WA (US)

( * ) Notice: Subject to any disclaimer, the term of this patent is extended or adjusted under 35 U.S.C. 154(b) by 197 days.

(21) Appl. No.: 11/399,553

(22) Filed: Apr. 6, 2006

(65) Prior Publication Data

US 2007/0239649 A1    Oct. 11, 2007

(51) Int. Cl.
    *G06N 7/00*      (2006.01)
    *G06N 7/08*      (2006.01)

(52) U.S. Cl. .......................... 706/55; 714/38; 717/124; 717/127

(58) Field of Classification Search ............... 706/55; 717/123; 707/100, 102; 709/225
See application file for complete search history.

(56) References Cited

U.S. PATENT DOCUMENTS

2005/0132354 A1*   6/2005   Edwards et al. ............. 717/174
2006/0074731 A1*   4/2006   Green et al. .................. 705/8
2006/0143594 A1*   6/2006   Grimaldi ..................... 717/123

* cited by examiner

*Primary Examiner*—David R Vincent
*Assistant Examiner*—Kalpana Bharadwaj
(74) *Attorney, Agent, or Firm*—Workman Nydegger

(57) ABSTRACT

Generating coverage information identifying tested elements of a declarative data structure. A method includes exercising a first element of a declarative data structure. Information is gathered about the effects of exercising a first element of a declarative data structure on other elements of the declarative data structure. The information gathered about the effects of exercising a first element of a declarative data structure on other elements of the declarative data structure is collated and analyzed. The information gathered about the effects of exercising a first element of a declarative data structure on other elements is reported in a human understandable format.

19 Claims, 2 Drawing Sheets

CODE COVERAGE OF DECLARATIVE OBJECTS

BACKGROUND

Background and Relevant Art

Computers and computing systems have affected nearly every aspect of modern living. Computers are generally involved in work, recreation, healthcare, transportation, entertainment, household management, etc. The functionality of computers is enabled through software products that enable the use of computer programming and data structures that allow for the storage and manipulation of data.

Several declarative data structures find particular usefulness in computing environments and with computing systems. For example database systems use declarative data structures. Declarative code can be contrasted with imperative code. Imperative code includes computer code commands that "command" data to be a particular value or to have particular characteristics. Further, imperative commands are explicit commands that are sequentially executed when a data structure with the imperative commands is invoked. In contrast, declarative data structures involve the implicit execution of commands and definition of data to allow data to conform to desired characteristics.

Before software products are widely implemented, it may be desirable to test the software products to ensure functionality and correctness. In the context of imperative computer code, code coverage has been used to test imperative code. Code coverage invokes imperative commands, which often invoke other imperative commands, which invoke still other commands, etc. Thus, a single invocation of an imperative command can cause the invocation of a number of other imperative commands. Tracking agents and software can be used to record what code lines and code branches have been implemented. This can be used to present metrics to a user regarding what imperative code lines have been tested.

While code coverage has been applied to imperative programming, code coverage has not been applied to declarative objects such as database schema, XML documents and the like.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One exemplary embodiment described herein includes a method of generating coverage information identifying tested elements of a declarative data structure. The method includes exercising a first element of a declarative data structure. Information is gathered about the effects of exercising a first element of a declarative data structure on other elements of the declarative data structure. The information gathered about the effects of exercising a first element of a declarative data structure on other elements of the declarative data structure is collated and analyzed. The information gathered about the effects of exercising a first element of a declarative data structure on other elements is reported in a human understandable format. Similar embodiments may be embodied on a computer readable medium including data structures and computer executable instructions for implementing the embodiments.

Another embodiment includes a method of generating coverage information identifying tested elements of a declarative data structure. The method includes performing an operation on an element of the declarative data structure. Effects are detected on one or more constructs of the declarative data structure as a result of performing an operation on an element of the declarative data structure. Information is collected regarding the effects on the one or more constructs of the declarative data structure. The information is summarized in a human readable form.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments herein may comprise a special purpose or general-purpose computer including various computer hardware, as discussed in greater detail below.

In one exemplary embodiment, coverage of elements in a declarative data structure can be performed similar to coverage of code elements in imperative code. For example, in one embodiment, an element of a declarative data structure can be exercised. Exercising the element of the declarative data structure can result in changes in other elements of the declarative data structure, firing of triggers associated with the declarative data structure, and the like. These changes and result can be detected and summarized and finally presented in a human readable form to a human user.

For example, a cell in a database may have an operation performed on the cell. For example, data may be written to the cell, data may be changed in the cell, data may be deleted from the cell, data may be read from the cell, etc. Performing any of these operations to the cell may cause changes in other cells in the database. The changes to other cells are detected. A record is maintained summarizing all cells which were affected by the operation on the cell. Any cells in which changes are detected and recorded are considered "covered." A database designer then has some degree of confidence as to the robustness and functionality of the database. Additional operations may be performed to other elements of the database, and other affected cells may be recorded. Various output mechanisms can then provide results to the database designer.

Figure 1:
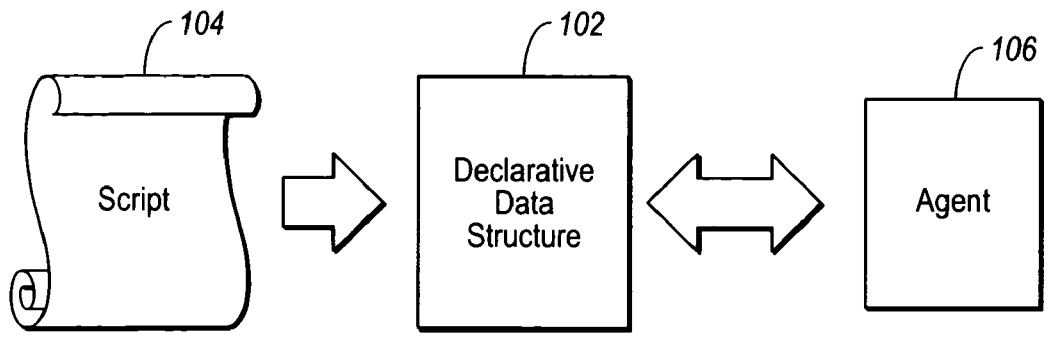
FIG. 1 illustrates tools for exercising a declarative data structure.

Referring now to FIG. 1, an exemplary embodiment is illustrated. In the example shown, coverage is being generated and evaluated for a declarative data structure 102. The declarative data structure 102 can be evaluated by exercising one or more elements of the declarative data structure 102, gathering information about the effects of exercising elements of the declarative data structure, collating and analyzing the information, and reporting the information to a user.

In the example shown in FIG. 1, a script 104 is used to exercise the elements in the declarative data structure 102. The script 104 may include instructions for performing various operations on one or more elements of the declarative data structure 102. By using a script, a number of instructions for exercising elements can be included and applied to increase the overall coverage result.

FIG. 1 further illustrates an agent 106. The agent 106 monitors the declarative data structure 102 to detect changes in elements of the declarative data structure 102 and to gather information about the effects of exercising elements in the declarative data structure on other elements in the declarative data structure. Several methods may be employed by the agent 106 to detect changes in elements of the declarative data structure 102. In one embodiment, the agent 106 may be embodied as including instrumentation of an underlying runtime. In another embodiment, the agent 102 may query various elements of the declarative data structure 102 at various times to determine what elements have changed. In one embodiment, the agent 106 may monitor elements of the declarative data structure to determine what changes have been made.

The agent 106 may also include functionality for collating and analyzing the information about the effects of exercising elements in the declarative data structure on other elements in the declarative data structure. In addition, the agent 106 may include functionality for reporting the gathered information in a human readable form. For example, the agent 106 may include the ability to interface with user interface elements to present the gathered information in an appropriate format. Several examples of these formats will be described in more detail below.

The declarative data structure 102 may be embodied as one or more of several declarative data structures. For example, the declarative data structure 102 may be embodied as a database. As described previously, the script 104 may be used to perform operations to insert data into a cell, delete data from a cell, modify data in a cell, read data from a cell, etc. The effects of the operations on other elements of the database may be monitored and recorded. For example, changes to other cells, columns, and/or rows may be detected. Additionally, the function of various database features can be covered. For example, the functionality of a check clause may be validated. A check clause designates a condition that must be met before data can be inserted into a column.

As discussed in examples above, the declarative data structure 102 may be, in one embodiment, a database. For example, a Structured Query Language (SQL) database may be checked for coverage. In one embodiment, the SQL Trace command may be used for the coverage collection agent on an SQL server. One embodiment embodies as a Microsoft SQL server. The SQL Trace command streams to an Event Tracing for Windows (ETW) trace session, a file or to process code. A Service Broker can forward events to remote web services, SQL Servers, etc. Reading the transaction log can provide additional information about column level operations. Similarly, hooking some SQL Server structures may also provide addition information about column level operations.

The following summarizes a list of constructs and operations for the constructs for a database context where coverage data may be generated. One construct is a table construct. It may be desirable to generate coverage data for insert, update and delete operations.

Another construct is a view construct. A view is a particular way of viewing a database. Typically, a view arranges the records in some order and makes only certain fields visible. The view construct may be queried and if the view construct is updatable, then insert, update and delete operations may be tested and coverage data generated.

Another construct is a table column. It may be desirable to generate coverage data for insert, update and delete commands.

Another construct is a foreign key. Foreign keys enforce referential integrity by completing an association between two entities. Operations where coverage data may be beneficial include successful insert and update operations, failure of insert and update operations, delete through (specifying a range of records to delete) and update through operations.

Another construct is a check clause. As described above, a check clause designates a condition that must be met before data can be inserted into a column. Operations that may be tested and covered include insert/update for each success and failure case.

Another construct is default. Operations may be tested for when an insert operation uses a default construct and when an insert operation does not use default construct.

Another class of constructs that may be tested for coverage is triggers. A trigger is a block of statements that are executed based on an occurrence such as an insert, update, or delete operation to a table or on a view. Whether or not a trigger fired may be tested and recorded in code coverage information.

Another construct that may be tested and coverage data stored for relates to queues. The addition or removal of items from the queue may be monitored and recorded to determine coverage information for the queue.

Another declarative data structure where code coverage information may be generated relates to XML documents and XML schema. XML is short for Extensible Markup Language. XML allows for the creation of customized document and message formats. This can be used to create custom interfaces by customizing definitions, transmission, validation, and interpretation of data between applications. In an XML context, coverage of schema constructs and constraints can be recorded.

Another class of declarative data structures that may have code coverage applied to them is Online Analytical Processing (OLAP) data structures. OLAP is a category of software tools that provides analysis of data stored in a database. OLAP tools enable users to analyze different dimensions of multidimensional data. For example, OLAP provides time series and trend analysis views. OLAP may be used for example in data mining. For OLAP, code coverage information may be gathered for cubes (multi-dimensional databases) and portions of select statements.

Hyper-Text Mark-up Language (HTML) may also have code coverage information collected for it. For example, code coverage information can be gathered regard whether or not links, buttons, text boxes, etc have been exercised.

Web Services Description Language (WSDL), an XML-formatted language used to describe a Web service's capabilities as collections of communication endpoints capable of exchanging messages may also have coverage information generated for it.

The examples above are only exemplary, and is should be understood that the principles herein may be applied to other declarative data structures as well.

Notably, the examples described above may find usefulness in a number of different environments. One particular environment is agile programming environments. By being able to test declarative data structures and summarize covered portions of a declarative data structure, the principles of agile programming can be applied to declarative data objects.

Figure 2:
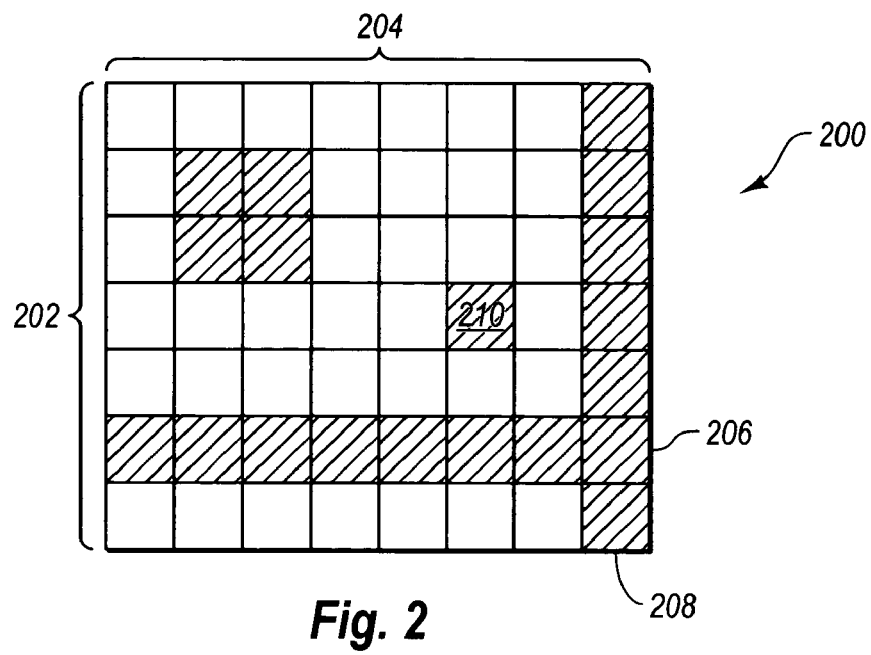
FIG. 2 illustrates a declarative data structure and indications of portions of the declarative data structure that have been exercised.

As described previously, information can be reported in a human understandable format to a user to indicate where code is covered. For example, attention is now directed to FIG. 2 which illustrates a graphical representation of coverage in a declarative data structure such as a database. FIG. 2 illustrates a data structure 200 which includes rows 202 and columns 204. FIG. 2 illustrates portions of the data structure 200 that are covered by shading the covered portions. Notably, as described above, coverage information may be generated for an entire row such as row 206, and entire column such as column 208, for individual cells such as cell 210, etc. Thus, when the declarative data structure may be represented in a convenient graphical form, a graphical representation may be presented to a user to illustrate portions of the declarative data structure that are covered by appropriate testing.

Figure 3:
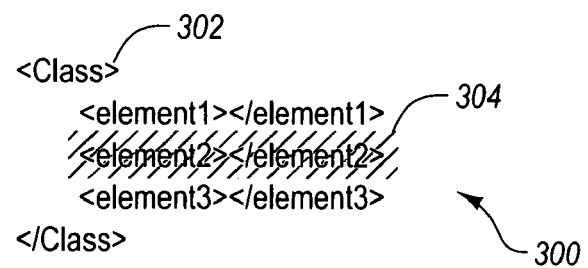
FIG. 3 illustrates another declarative data structure and indications of exercised portions of the declarative data structure.

Referring now to FIG. 3, another example of a graphical representation of covered code for declarative objects is illustrated. FIG. 3 illustrates a block of XML code 300. The block of XML code 300 defines a class including three elements of the class. As illustrated a second element 304 of the class has been shaded so as to illustrate that this particular element has been covered. Notably while shading is performed in this example, it should be noted that other indicators can be used as well. For example, covered elements may be presented in different colors than uncovered elements. In an alternative embodiment covered elements may be presented with an in-line character or other in-line text on a line with the particular covered element. Other indicators may also be used within the scope of embodiments described herein.

Notably, other summarizations of declarative element coverage may be implemented. For example, in one embodiment, a graphical textual display may summarize coverage information. For example, summarizing statistics may include percentage of coverage, number of possible elements, and/or number of elements covered. Similarly, statistics may also be present summarizing portions of a declarative data structure that have not been covered. For example, a statistic may explicitly state the number of elements not covered, and/or a percentage of elements not covered.

Figure 4:
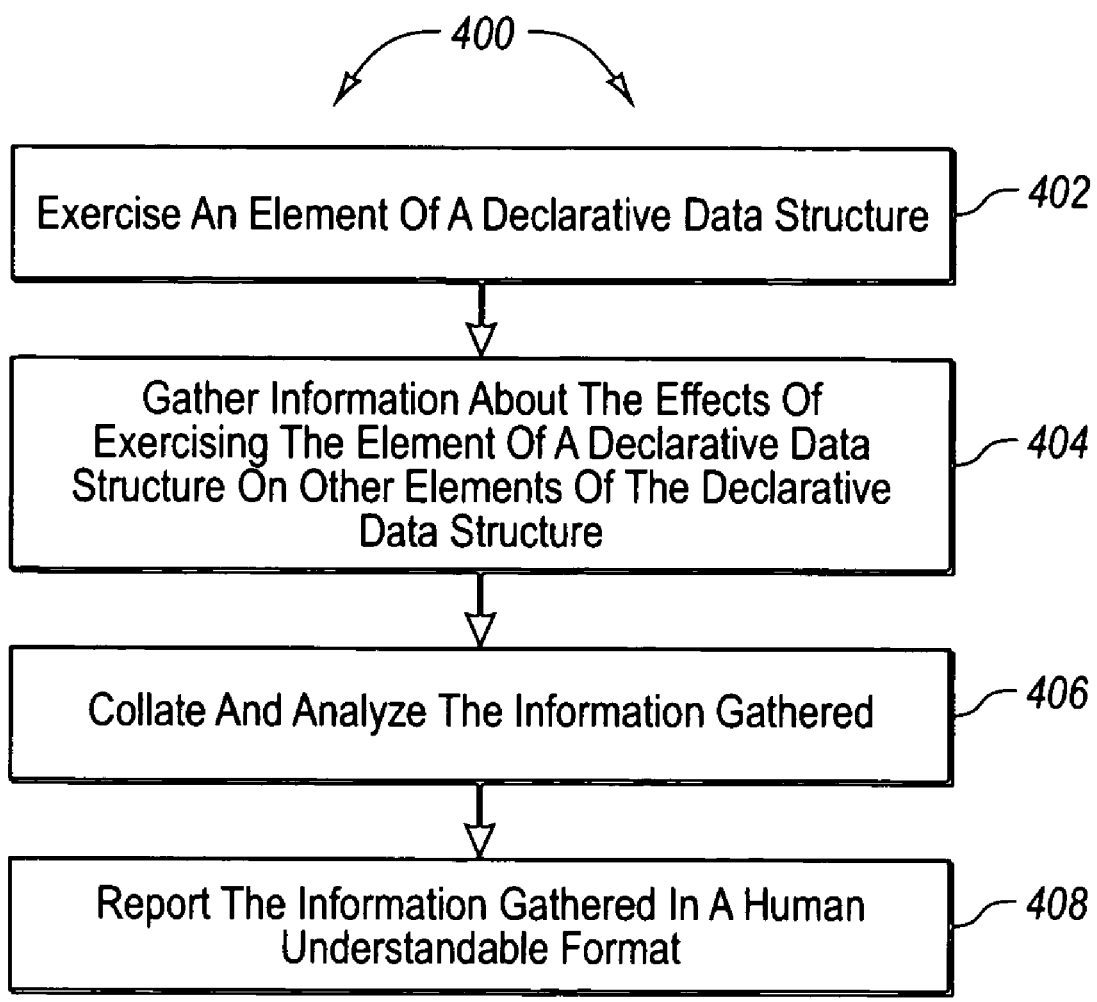
FIG. 4 illustrates a method of exercising declarative data structure.

Referring now to FIG. 4, a method 400 of generating coverage information identifying tested elements of a declarative data structure is illustrated. The method 400 includes exercising a first element of a declarative data structure (act 402). Exercising a first element of a declarative data structure may include, for example, applying a script to the declarative data structure. The script may include one or more commands to be executed on elements of the declarative data structure. When the declarative data structure is a database, exercising a first element of a declarative data structure may include applying various database commands such as delete, update, query, create, or insert commands applied to a database field.

Notably several different types of declarative data structures may have coverage information collected for them. As illustrated in the examples above, some examples of these data structures include databases, XML schema, an OLAP cube, an HTML document, a WSDL document etc.

The method 400 further includes gathering information about the effects of exercising a first element of a declarative data structure on other elements of the declarative data structure (act 404). When the declarative data structure includes a database, gathering information about the effects of exercising a first element of a declarative data structure on other elements of the declarative data structure may include noting effects on a table, row, column, cell, foreign key, check clause, trigger, default construct, a queue, etc.

In one embodiment, gathering information about the effects of exercising a first element of a declarative data structure on other elements of the declarative data structure includes monitoring the declarative data structure with an agent.

In an alternative embodiment, gathering information about the effects of exercising a first element of a declarative data structure on other elements of the declarative data structure may include using instrumentation of an underlying runtime to determine what elements are exercised as a result of exercising the first element of the declarative data structure. For example, using instrumentation of an underlying runtime comprises using a trace command in an SQL database.

In one embodiment, gathering information about the effects of exercising a first element of a declarative data structure on other elements of the declarative data structure may include analyzing other elements of the declarative data structure to determine changes as a result of exercising the first element of the declarative data structure.

The method 400 further includes collating and analyzing the information gathered about the effects of exercising a first element of a declarative data structure on other elements of the declarative data structure (act 406).

The method 400 further includes reporting the information gathered about the effects of exercising a first element of a declarative data structure on other elements in a human understandable format (act 408). For example, reporting the information gathered about the effects of exercising a first element of a declarative data structure on other elements in a human understandable format may include presenting a graphical display summarizing statistics including at least one of percentage of coverage, number of possible elements, number of elements covered, number of elements not covered, or percentage of elements not covered. In an alternative embodiment, reporting the information gathered about the effects of exercising a first element of a declarative data structure on other elements in a human understandable format may include presenting a graphical display illustrating a graphical representation of the declarative data structure. The graphical display graphically illustrates elements of the declarative data structure that are covered. FIG. 2 illustrates an example of this embodiment.

In yet another embodiment, reporting the information gathered about the effects of exercising a first element of a declarative data structure on other elements in a human understandable format may include providing a text file and an indicator for portions of the text file representing covered elements. Examples of this are illustrated in FIG. 3 and the corresponding text above describing FIG. 3.

Embodiments may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

For example, in one embodiment, computer readable media may include a data structure defining a script that may be applied to a declarative data structure. The computer readable media may further include computer executable instructions defining an agent for gathering and presenting information regarding elements of a declarative data structure that have been exercised.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer implemented method of generating coverage information identifying tested elements of a declarative data structure, the method comprising a computer processing device performing the following:
   exercising a first element of a declarative data structure, wherein the declarative data structure is at least one of a database, an XML schema, an OLAP cube, an HTML document, or a WSDL document;
   gathering information about the effects of exercising the first element of a declarative data structure on other elements of the same declarative data structure containing the first element of the declarative data structure;
   collating and analyzing the information gathered about the effects of exercising the first element of the declarative data structure on other elements of the same declarative data structure; and
   reporting the information gathered about the effects of exercising a first element of a declarative data structure on other elements in a human understandable format, including by presenting a graphical display illustrating a graphical representation of the declarative data structure the graphical display graphically illustrating elements of the declarative data structure that are covered.

2. The method of claim 1, wherein exercising a first element of a declarative data structure comprises applying a script to the declarative data structure, the script including one or more commands to be executed on elements of the declarative data structure.

3. The method of claim 1, wherein exercising a first element of a declarative data structure comprises applying at least one of a delete, update, query, create, or insert command to a database field.

4. The method of claim 1, wherein gathering information about the effects of exercising the first element of a declarative data structure on other elements of the declarative data structure comprises noting effects on at least one of a table, row, column, cell, foreign key, check clause, trigger, default construct, or a queue.

5. The method of claim 1, wherein gathering information about the effects of exercising the first element of the declarative data structure on other elements of the same declarative data structure comprises monitoring the declarative data structure with an agent.

6. The method of claim 1, wherein gathering information about the effects of exercising the first element of the declarative data structure on other elements of the same declarative data structure comprises using instrumentation of an underlying runtime to determine what elements are exercised as a result of exercising the first element of the declarative data structure.

7. The method of claim 6, wherein using instrumentation of an underlying runtime comprises using a trace command in an SQL database.

8. The method of claim 1, wherein gathering information about the effects of exercising the first element of the declarative data structure on other elements of the same declarative data structure comprises analyzing other elements of the declarative data structure to determine changes as a result of exercising the first element of the declarative data structure.

9. The method of claim 1, wherein reporting the information gathered about the effects of exercising the first element of the declarative data structure on other elements in a human understandable format comprises presenting a graphical display summarizing statistics including at least one of percentage of coverage, number of possible elements, number of elements covered, number of elements not covered, or percentage of elements not covered.

10. The method of claim 1, wherein reporting the information gathered about the effects of exercising the first element of the declarative data structure on other elements in a human understandable format, including by presenting a graphical display illustrating a graphical representation of the declarative data structure the graphical display graphically illustrating elements of the declarative data structure that are covered comprises at least one of shading, coloring, providing in-line characters, or providing in-line text.

11. The method of claim 1, wherein reporting the information gathered about the effects of exercising the first element of the declarative data structure on other elements in a human understandable format comprises providing a text file and an indicator for portions of the text file representing covered elements.

12. A computer readable storage medium comprising:
   A first data structure including a script comprising commands to be applied to a declarative data structure to exercise one or more elements of the declarative data structure, wherein the declarative data structure is at least one of a database, an XML schema, an OLAP cube, an HTML document, or a WSDL document;

a second data structure defining an agent, wherein the second data structure comprises computer executable instructions configured to be executed by a computer processing device:

computer executable instructions that when executed by a computer processing device are configured to gather information about the effects of exercising a first element of a declarative data structure on other elements of the declarative data structure;

computer executable instruction that when executed by a computer processing device are configured to collate and analyze the information gathered about the effects of exercising a first element of a declarative data structure on other elements of the declarative data structure; and computer executable instructions that when executed by a computer processing device are configured to report the information gathered about the effects of exercising a first element of a declarative data structure on other elements in a human understandable format, including by presenting a graphical display illustrating a graphical representation of the declarative data structure the graphical display graphically illustrating elements of the declarative data structure that are covered.

13. The computer readable medium of claim 12, wherein the computer executable instructions configured to gather information about the effects of exercising the first element of a declarative data structure are configured to query various elements of the declarative data structure at various times to determine what elements have changed.

14. The computer readable medium of claim 12, wherein the computer executable instructions configured to gather information about the effects of exercising the first element of a declarative data structure are configured to monitor elements of the declarative data structure to determine what changes have been made to elements of the declarative data structure.

15. A method of generating coverage information identifying tested elements of a declarative data structure, including elements that have been exercised or changed as a result of exercising other elements, the method comprising at a computer processing device:

performing an operation on an element of the declarative data structure;

detecting effects on one or more constructs of the declarative data structure as a result of performing an operation on the element of the declarative data structure, and wherein detecting effects on one or more constructs of the declarative data structure comprises detecting effects on at least one of a table, a view, a column, a foreign key, a check clause, a trigger, a queue, coverage of schema constructs and constraints in an XML schema, cubes and portions of select statements, or links, buttons, and text boxes;

collecting information regarding the effects on the one or more constructs of the declarative data structure; and summarizing the information in a human readable form, including by presenting a graphical display illustrating a graphical representation of the declarative data structure the graphical display graphically illustrating elements of the declarative data structure that are covered.

16. The method of claim 15, wherein detecting effects on one or more constructs of the declarative data structure comprises detecting effects on at least one of a table, a view, a column, a foreign key, a check clause, a trigger, or a queue.

17. The method of claim 15, wherein detecting effects on one or more constructs of the declarative data structure comprises detecting effects on coverage of schema constructs and constraints in an XML schema.

18. The method of claim 15, wherein detecting effects on one or more constructs of the declarative data structure comprises detecting effects on cubes and portions of select statements.

19. The method of claim 15, wherein detecting effects on one or more constructs of the declarative data structure comprises detecting effects on links, buttons, and text boxes.

* * * * *

UNITED STATES PATENT AND TRADEMARK OFFICE
CERTIFICATE OF CORRECTION

PATENT NO. : 7,603,334 B2
APPLICATION NO. : 11/399553
DATED : October 13, 2009
INVENTOR(S) : Anthony C. Bloesch Page 1 of 1

It is certified that error appears in the above-identified patent and that said Letters Patent is hereby corrected as shown below:

In Title page, item (75), under "Inventor" column 1, line 1, delete "Anthony C. Beloesch," and insert -- Anthony C. Bloesch, --, therefor.

Signed and Sealed this
First Day of March, 2011

David J. Kappos
*Director of the United States Patent and Trademark Office*